(12) United States Patent
Rozema

(10) Patent No.: US 7,882,941 B2
(45) Date of Patent: Feb. 8, 2011

(54) VISCOUS SHEAR DAMPING STRUT ASSEMBLY

(75) Inventor: Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 620 days.

(21) Appl. No.: 11/763,818

(22) Filed: Jun. 15, 2007

(65) Prior Publication Data
US 2008/0308366 A1    Dec. 18, 2008

(51) Int. Cl.
    *F16D 57/02*    (2006.01)
    *B64B 1/28*    (2006.01)

(52) U.S. Cl. ................................. 188/293; 244/53 R

(58) Field of Classification Search .............. 244/129.4, 244/53 R; 188/306, 290, 296, 322.5, 293, 188/291
See application file for complete search history.

(56) References Cited

U.S. PATENT DOCUMENTS

| | | | |
|---|---|---|---|
| 597,601 A | 1/1898 | Blaser | |
| 1,273,059 A | 7/1918 | Hild | |
| 4,323,356 A | 4/1982 | Stephenson | |
| 4,342,135 A | 8/1982 | Matsuo et al. | |
| 4,503,952 A * | 3/1985 | Hesse | 188/306 |
| 4,614,004 A * | 9/1986 | Oshida | 16/82 |
| 4,700,822 A | 10/1987 | Maucher et al. | |
| 4,946,131 A | 8/1990 | Weyand | |
| 5,004,215 A | 4/1991 | Aubry et al. | |
| 5,301,775 A * | 4/1994 | Nedbal et al. | 188/290 |
| 5,323,884 A | 6/1994 | Machino | |
| 5,407,325 A | 4/1995 | Aubry | |
| 5,862,896 A | 1/1999 | Villbrandt et al. | |
| 5,896,959 A | 4/1999 | Jeffries et al. | |
| 6,193,223 B1 * | 2/2001 | Jackson | 267/64.12 |
| 2007/0045068 A1 | 3/2007 | Namuduri et al. | |

OTHER PUBLICATIONS

International Search Report issued in PCT/US2008/065606 (2009).

* cited by examiner

*Primary Examiner*—Tien Dinh
(74) *Attorney, Agent, or Firm*—Barnes & Thornburg LLP

(57) ABSTRACT

A damping device using viscous shear to moderate substantially linear movement. The device has a housing with one or more reservoirs containing a viscous fluid, such as silicone, and one or more retractable struts that can extend from the housing. The strut has a portion formed as a toothed rack, and an associated axle has a pinion gear on a portion associated with the toothed rack of the strut. The teeth of the rack mate with teeth of the pinion gear. A disk, or preferably series of spaced disks, can be mounted on the axle inside the reservoir to dampen linear movement of the strut, from shear with a static plate adjacent to the disk on the axle. The relatively fixed, spaced disks or plates are adjacent to or interdigitated with the disks on the gear axles to dampen linear movement of a strut.

19 Claims, 11 Drawing Sheets

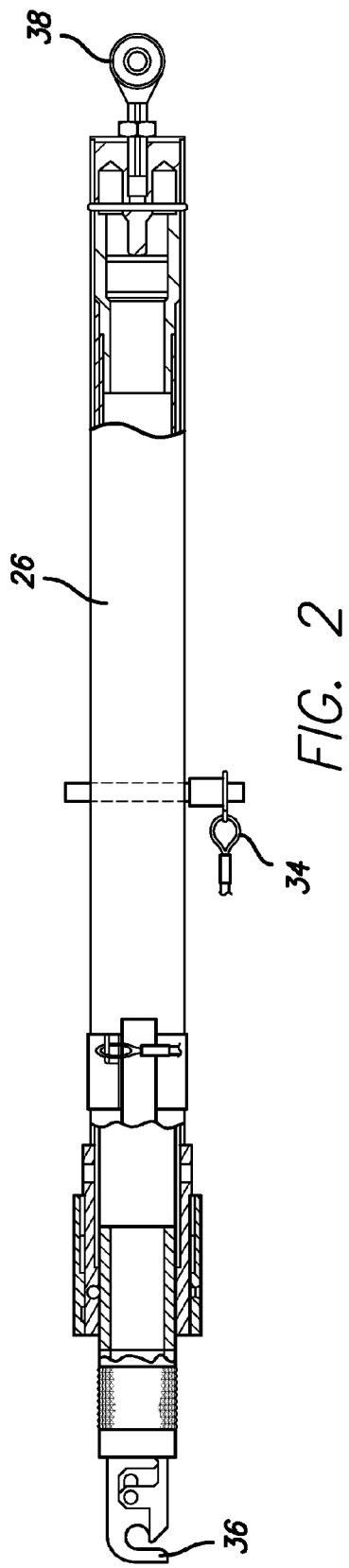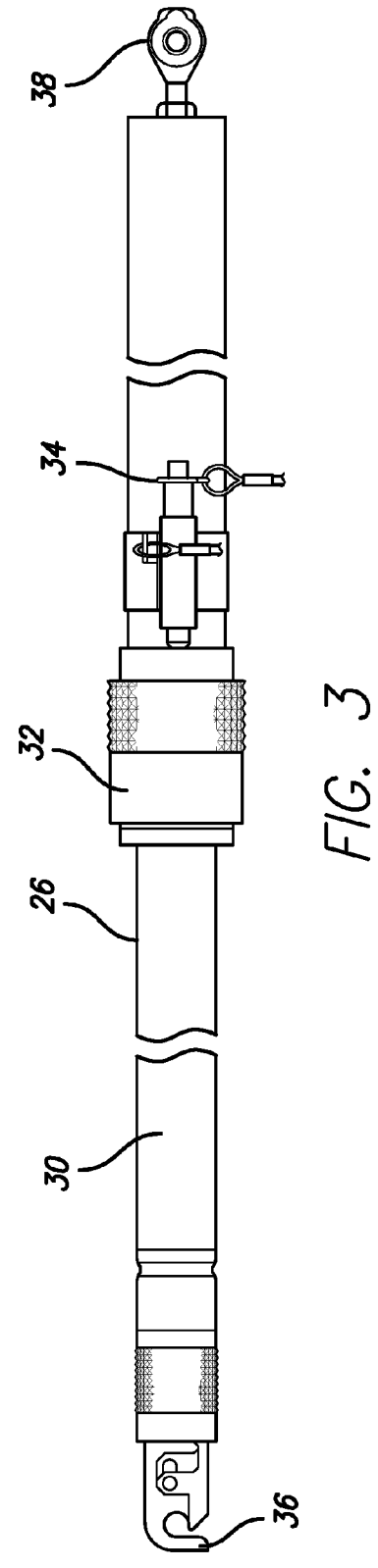

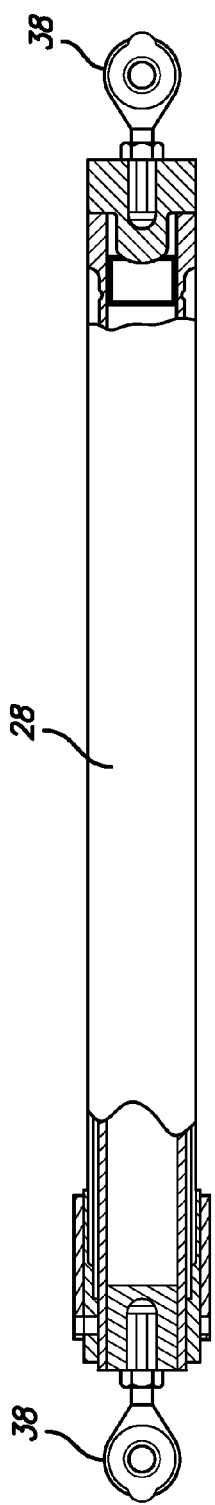
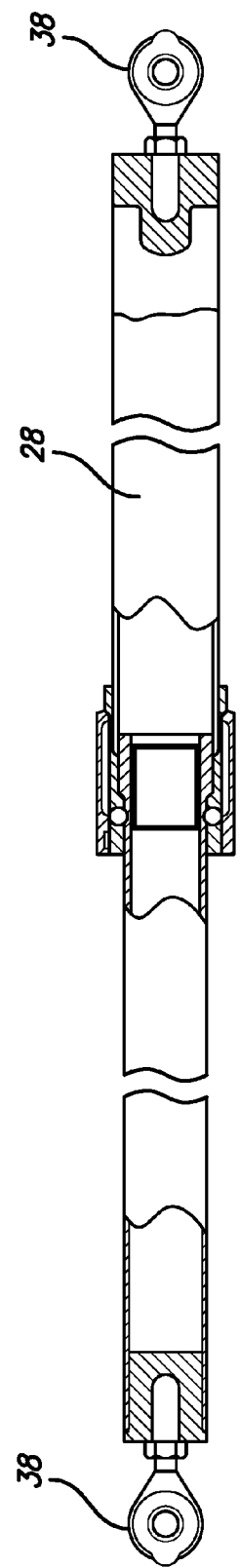
FIG. 4
FIG. 5

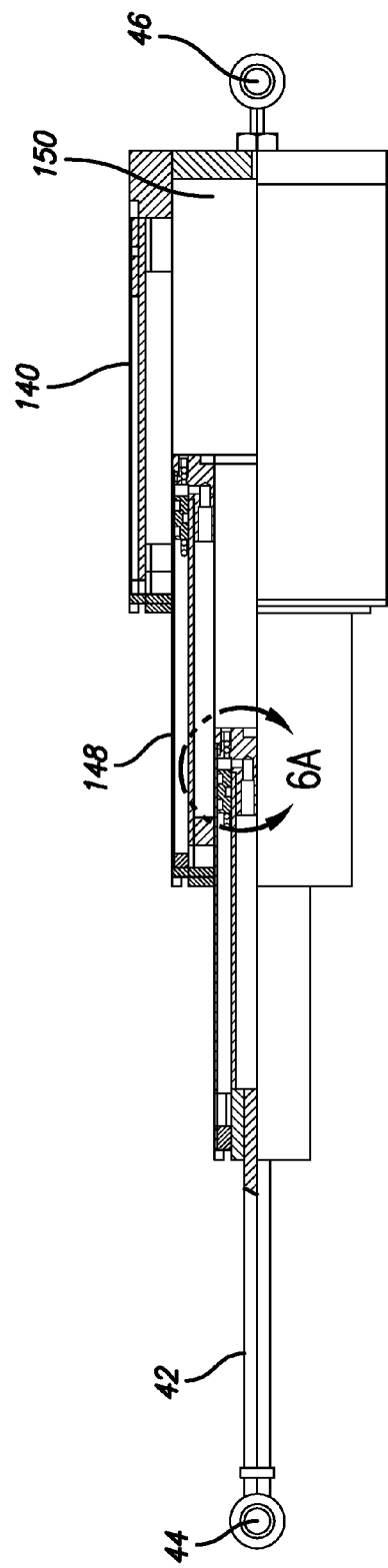
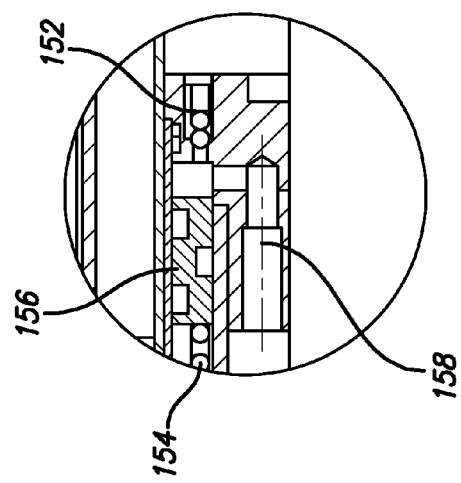
FIG. 6
FIG. 6A

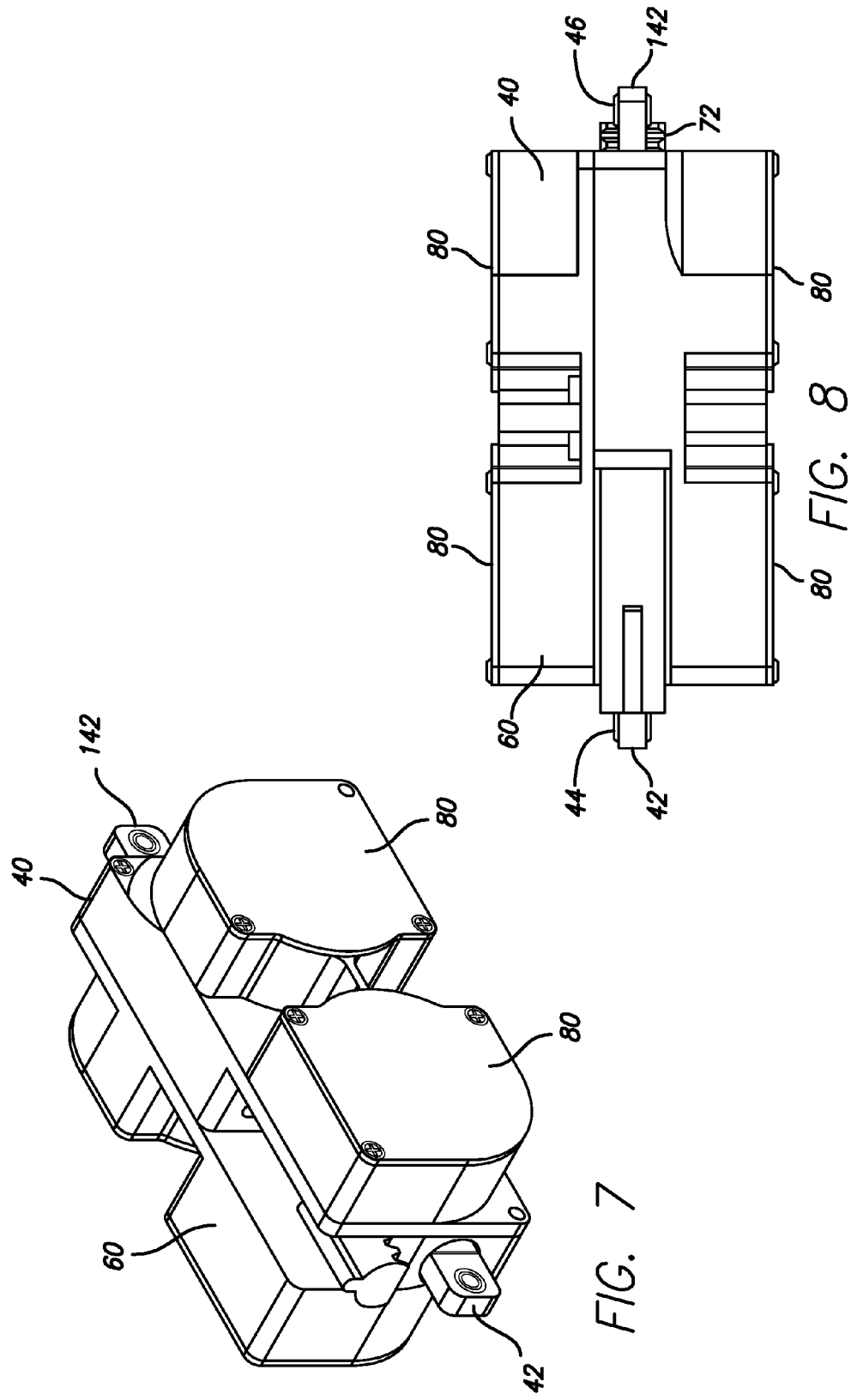

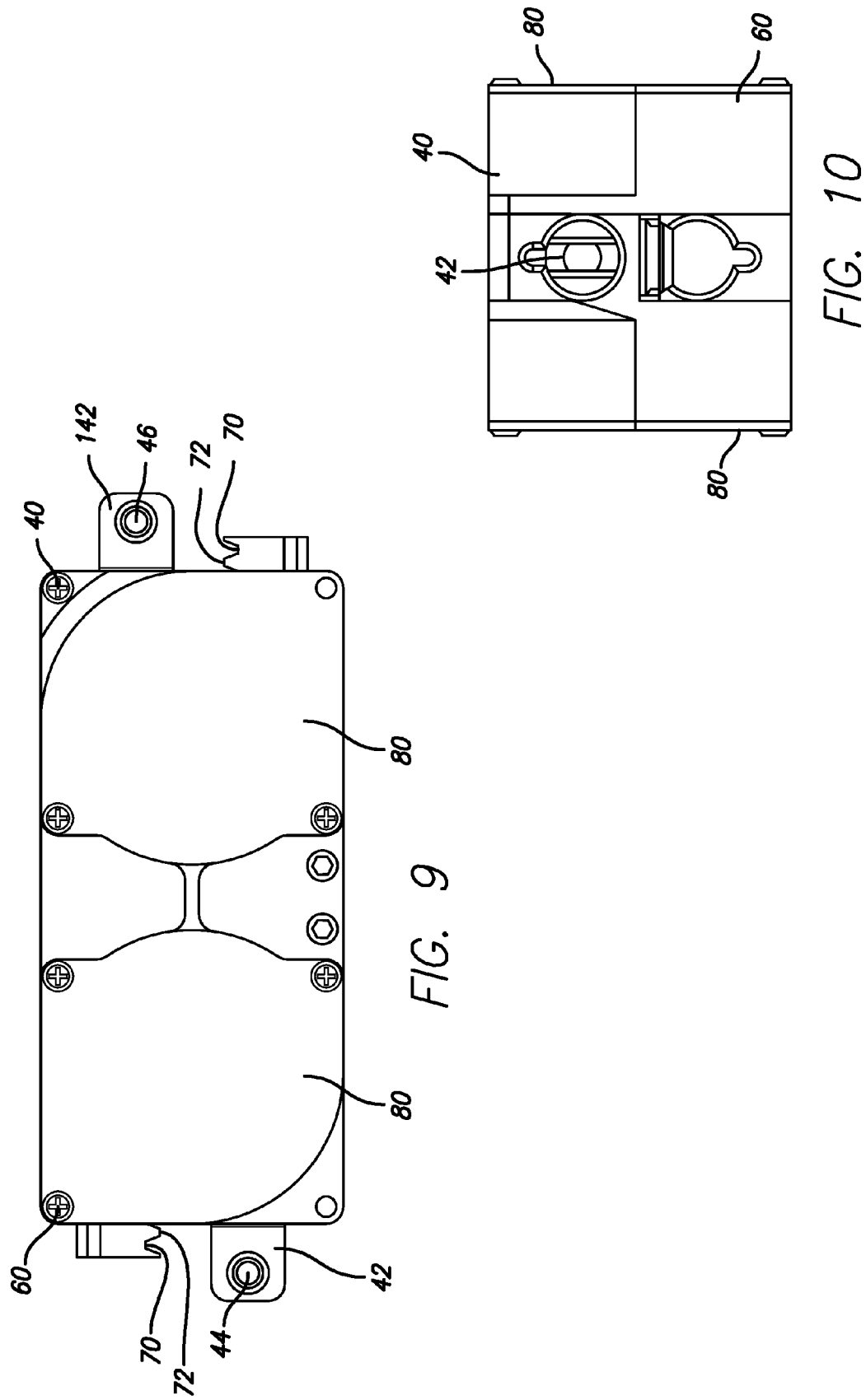

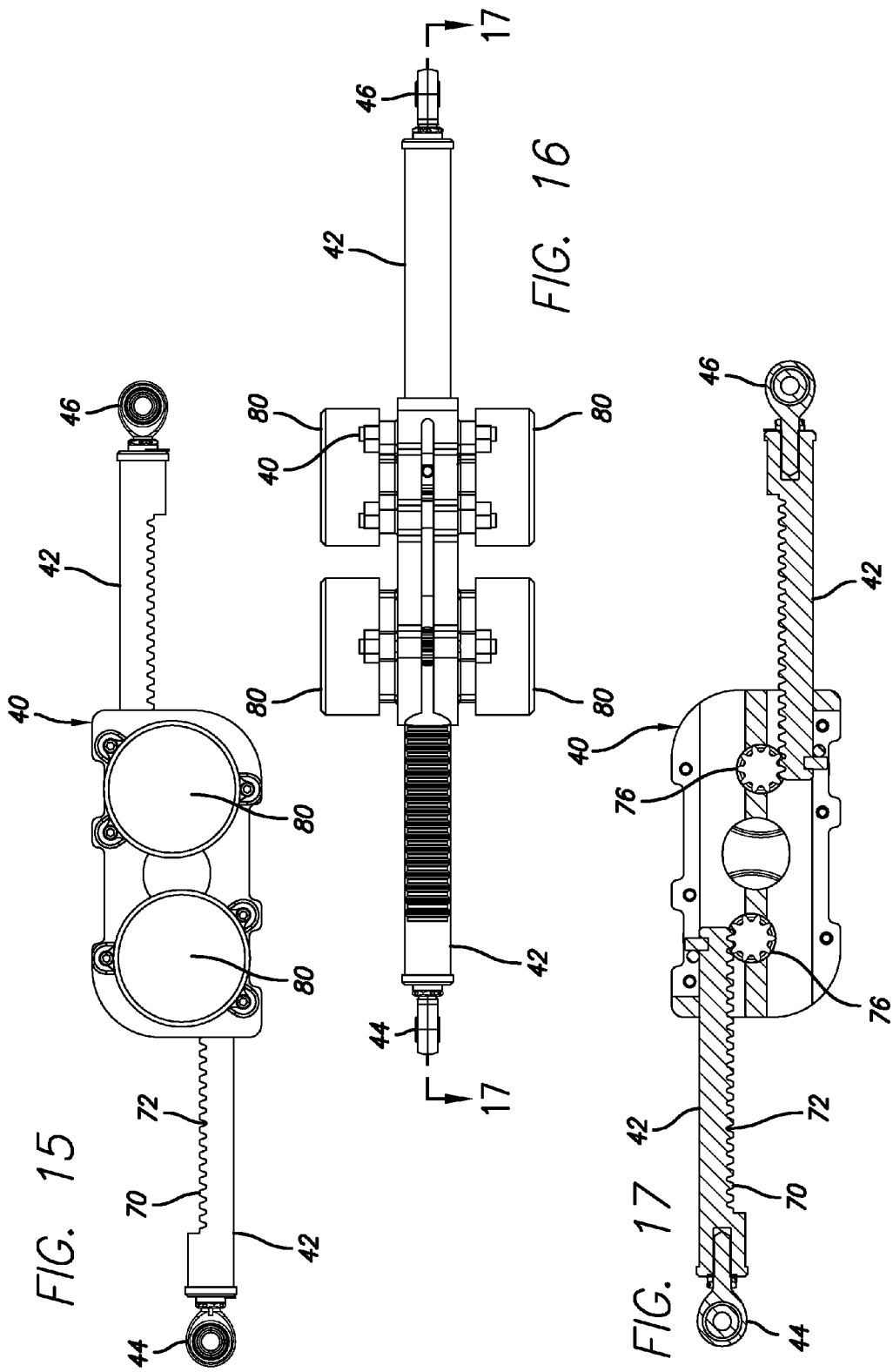

FIG. 18
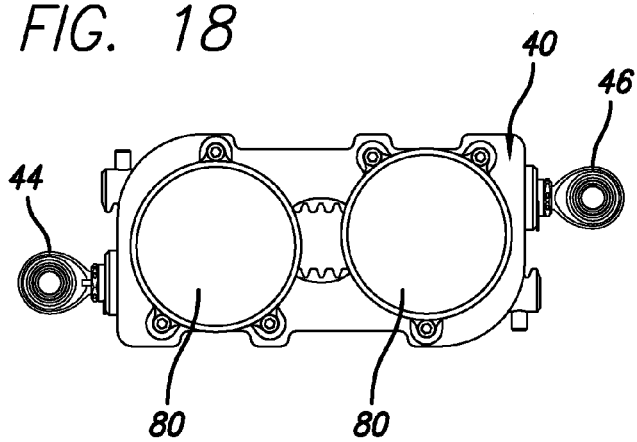
FIG. 19
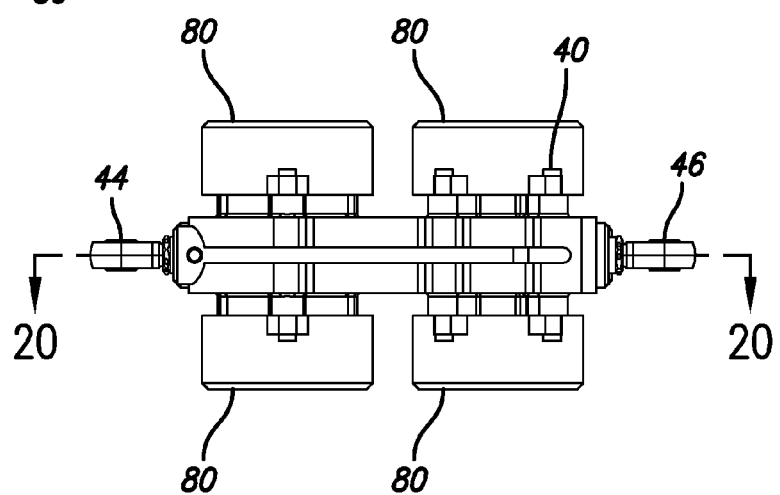
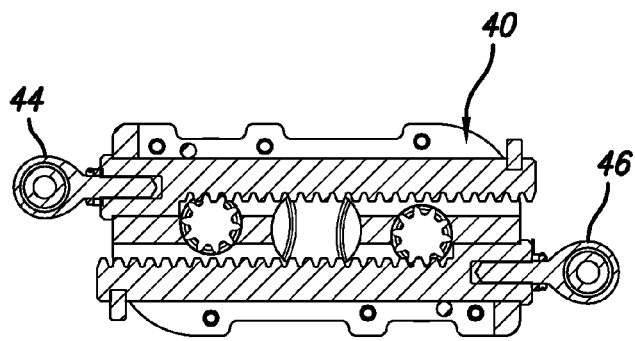
FIG. 20
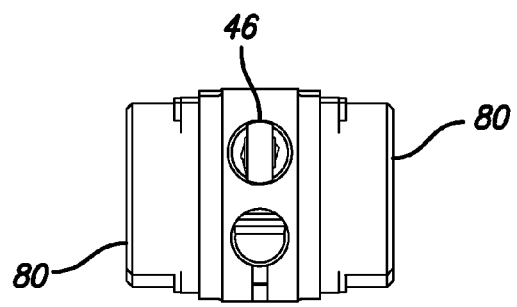
FIG. 21

VISCOUS SHEAR DAMPING STRUT ASSEMBLY

BACKGROUND

This disclosure relates to a viscous shear damping strut assembly, and specifically to a damping device with interacting disks for viscous shear to dampen the strut assembly in a mainly linear direction.

Although not limited to the field of use, the damping device may be used with aircraft systems. Certain aircraft systems are used with aircraft jet engines, which are often enclosed by nacelles, a large cylindrical-shaped structure that typically includes one or a pair of pivoting aircraft cowlings. Aircraft engine cowlings are often mounted by hinges to the engine support structure. Latch mechanisms have been used to releasably secure a first aircraft structure, such as an aircraft panel or cowling of an aircraft engine, to another aircraft structure.

Aircraft systems must be able to withstand harsh environments. Aircraft systems must withstand high vibration and extreme temperature and pressure ranges. For example, high pressure seals can break down in such a harsh environment. Damaged seals can cause fluid to leak.

Aircraft also have other special considerations. Space within an aircraft is limited such that components are preferably made as small and compact as possible. Also, weight can affect aircraft design and performance wherein lighter components meeting other desired parameters are preferred. Based on durability, components can be constructed of various materials that may become available.

Viscous shear between disks in a highly viscous fluid (such as silicone) can dampen linear movement. Rotary movement between rotating and relatively fixed (fixed or counter-rotating) disks leads to moderating shear forces of the fluid in the gaps between the disks. Inner friction of a viscous liquid and the surfaces dampens movement.

In this regard, it is desired to have a device for damping linear movement of a strut using principles of viscous shear. This can be used to moderate and smooth movement of opening or closing a panel. Additional features of the disclosure will become apparent upon consideration of the following description of embodiments of the disclosed damping strut assembly.

The present disclosure provides a damping device using viscous shear. The device has a housing with an associated reservoir containing a viscous fluid and one or more movable struts that can extend from and retract into the housing. In one embodiment, the strut has a portion formed as a toothed rack, and an associated axle has a pinion gear on a portion associated with the toothed rack of the strut, wherein teeth of the rack mate with teeth of the pinion gear. A disk or a series of spaced disks can be mounted on the axle inside the reservoir to dampen linear movement of the strut, from shear with a static (i.e. stationary) plate adjacent to the disk on the axle. The spaced disks or plates are adjacent to or interdigitated with the disks on the gear axles to dampen linear movement of a strut.

BRIEF DESCRIPTION OF DRAWINGS

The present disclosure will be described hereafter with reference to the attached drawings, which are given as a non-limiting example only, in which:

FIG. 2 shows a partially cut-away view of a retracted hold open rod;

FIG. 3 is side view of an extended hold open rod;

FIG. 4 shows a partially cut-away view of another retracted hold open rod;

FIG. 5 shows a partially cut-away view of the extended hold open rod;

FIG. 6 shows a partially cut-away view of a telescoping hydraulic damping device;

FIG. 7 is a perspective view of a viscous shear damping strut assembly, such as might house a highly viscous fluid such as silicone;

FIG. 8 is a top view of a viscous shear damping strut assembly showing the relationship of the strut rods to the housing;

FIG. 9 is a side view of a viscous shear damping strut assembly showing the relationship of the cavities or chambers of the housing and strut rods;

FIG. 10 is an end view of a viscous shear damping strut assembly;

FIG. 15 shows a side view of an extended viscous shear damping strut assembly;

FIG. 16 shows a top view of an extended viscous shear damping strut assembly;

FIG. 17 is cross sectional side view of an extended viscous shear damping strut assembly taken along 17-17 of FIG. 16;

FIG. 18 shows a side view of a retracted viscous shear damping strut assembly;

FIG. 19 shows a top view of an retracted viscous shear damping strut assembly;

FIG. 20 is cross sectional side view of an extended viscous shear damping strut assembly taken along 19-19 of FIG. 19; and FIG. 21 is an end view of a viscous shear damping strut.

Figure 1:
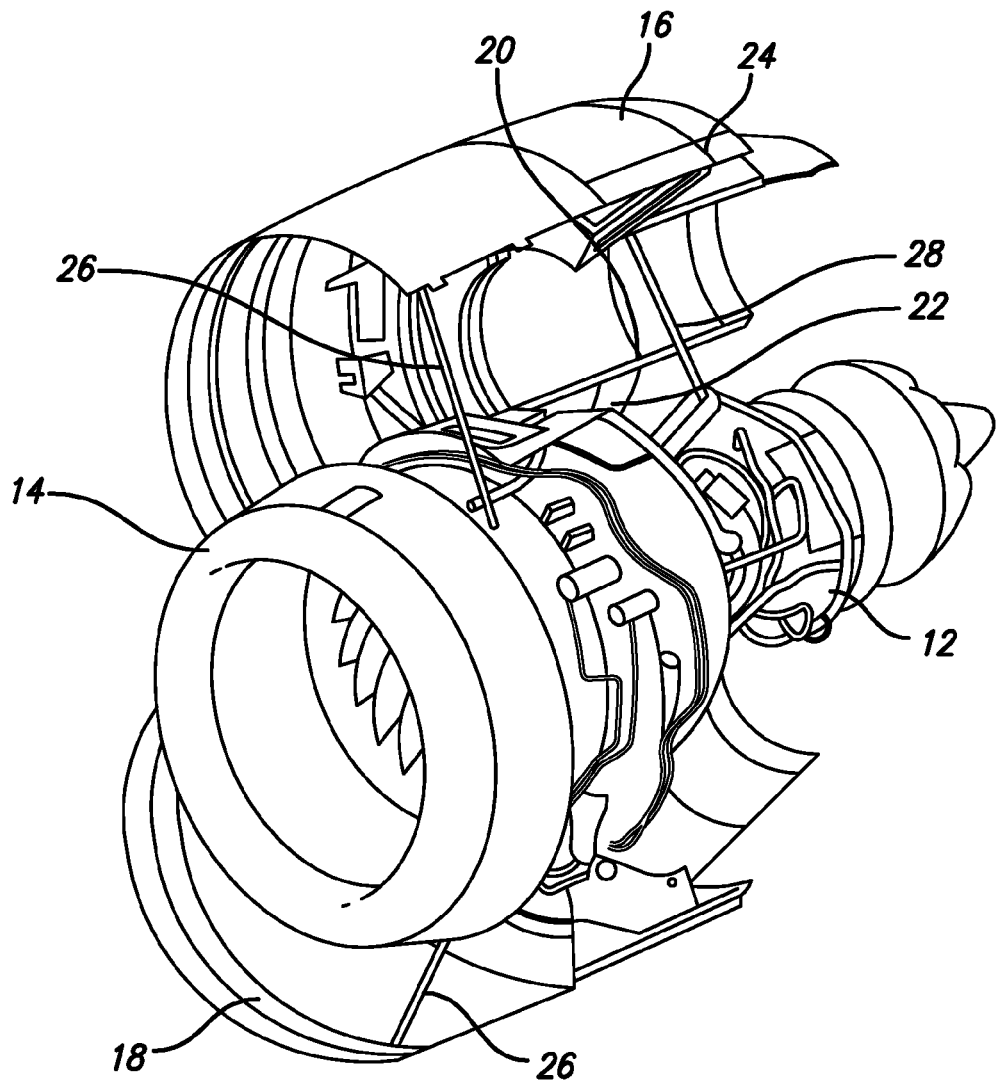
FIG. 1 is a perspective view of an aircraft jet engine with a pair of open aircraft cowlings, which may be retained in an open position with corresponding hold open rods.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, the drawings show, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

As shown in FIG. 1, aircraft jet engines 12 are usually enclosed by a large cylindrical-shaped structure 14 that typically includes one or a pair of aircraft panels or cowlings 16 and 18. Aircraft engine cowlings 16 and 18 are often mounted by hinges 20 to the engine support structure 22, such as where the engine can be mounted to the aircraft via an engine pylori. The cowlings 16 and 18 are hinged so that they can be pivoted to provide access to the engine 12 for maintenance and repair. During aircraft operation, the cowlings 16 and 18 must be pivoted into closed positions, and typically latched. Latches 24 for securing aircraft panels 16 and 18 are known and produced by Hartwell, such as disclosed in U.S. Pat. Nos. 6,629,712 and 6,189,832, which are incorporated by reference.

Hold open rod assemblies (forward 26 and aft 28) can be used on aircraft engine nacelles, such as Hartwell's H3383-1/-5 and -3 hold open rods used with the Boeing C17 engine nacelle. An inner tube 30 can be extended with a twist and pull mechanism 32 to release. FIG. 2 shows one embodiment of a hold open rod 26 in the retracted position, and FIG. 3 shows that embodiment in the extended position. A quick release pin 34 can be used as a manual lock in the retracted position and can be stowed or used as a backup in the extended position. One end of the hold open rod 26, such as the locking end, may have a quick release hook 36, and the other may have a rod end 38. FIG. 4 shows another embodiment of a hold open rod 28 in the retracted position, and FIG. 5 shows that embodiment in the extended position. As an option, both distal ends have rod ends 38.

A damping device 40 can provide for smooth and controlled opening of the aircraft panels 16 and 18. The damping device 40 dampens motion of a strut 42 in a substantially linear direction when used in conjunction with a pivotally mounted panel 16 and 18 and controls opening of the panel. The damping device 40 controls the rate of movement of items, such as panels 16 and 18, associated with the damping device 40.

A strut assembly 42 can be part of a damping device 40 that provides necessary damping loads to control movement of other components. While a damping device 40 may have one strut, the embodiments as shown have two ends. As shown in FIGS. 6-10, the strut 42 can have mounts 44 and 46, such as spherical bearings or rod ends, on opposing ends so that the strut 42 may be attached to a fixed structure 22 and a movable piece 16 or 18, such as a pivoting cowling or panel.

A first damping device 140 can be based on damping strut assemblies, including a four-stage telescoping damping unit 148 as shown in FIG. 6 in the extended position. This device 140 can provide bi-directional damping at different rates. A reservoir 150 may hold hydraulic fluid. A bleed valve 152 and a seal 156 can be at one end of each stage of telescoping struts 148. A spring 154 prevents cavitation behind the seal 156. Preferably, the damping device 140 includes a check value 158 or other type of flow regulator.

Per FIGS. 7-21, another style of damping device 40 is disclosed that can be used with various items, including an aircraft panel 16 or 18 in conjunction with one or more hold open rod 26 and 28. The damping device 40 provides for smooth, stable, controlled, and consistent movement. The damping device 40 has a housing 60 with an associated reservoir 50 containing fluid 62 with a retractable strut 42 that can extend from the housing 60. The strut 42 and an axle 64 operate on rack and pinion principles. One or preferably more spaced disks 66 can be mounted on the portion of the axle 64 (including an inner drive 65) that is in the reservoir 50 of the housing 60. The reservoir 50 has static plates 68, to broadly include, but not be limited to walls, disks, shims and platters, adjacent to one or more of the spaced disks 66 on the axle 64 to dampen linear movement of the strut 42. In the embodiments as shown, preferred for aircraft, two struts 42 and 142 are used as part of a damping device 40.

The damping device 40 includes a housing 60 from which one or more strut 42 and/or 142 can extend. The housing 60 preferably receives a pair of reciprocating struts 42 and 142, each entering the housing 60 on opposite sides and spaced vertically apart. Struts 42 and 142 can extend and retract from the housing 60 using rack and pinion principles. The struts 42 and 142 each have a portion formed with toothed racks 70. The strut 42 has teeth 72 in substantially a plane that cooperate with an axle 64 (preferably two) having a pinion gear 74 on a portion adjacent to the strut 42. The teeth 72 of the rack 70 mate with the teeth 76 of the pinion 74. As a rack 70 engages a pinion gear 74, the rack 70 moves in a straight line. Per rack and pinion principles, the damping force of rotating disks 66 is transferred to moderate linear movement of the strut 42.

Figure 11:
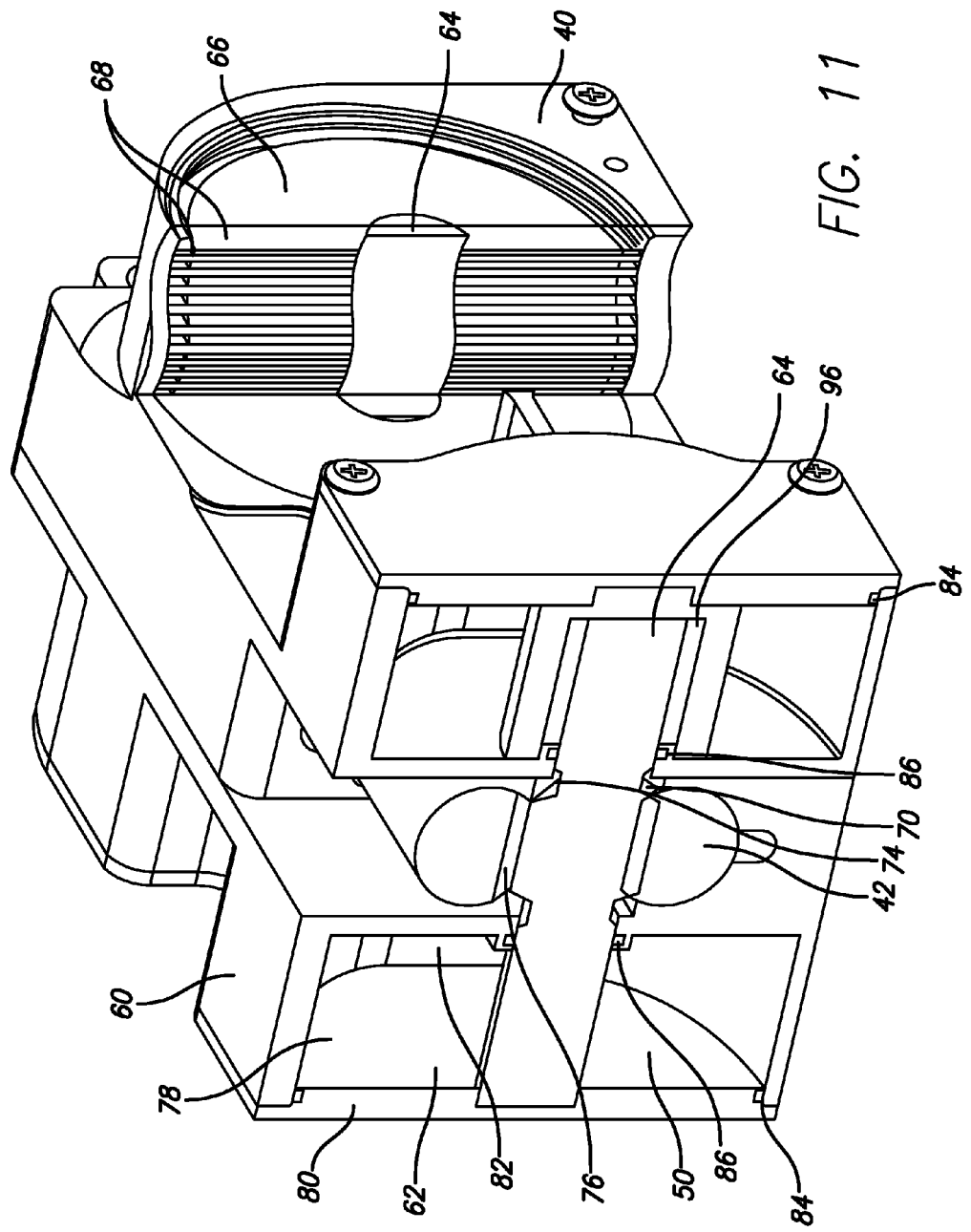
FIG. 11 is a perspective view of a partially cut away viscous shear damping strut assembly cut away to reveal the internal structure of the cavities, pinion gears, disks and struts with the front disks not shown.
Figure 12:
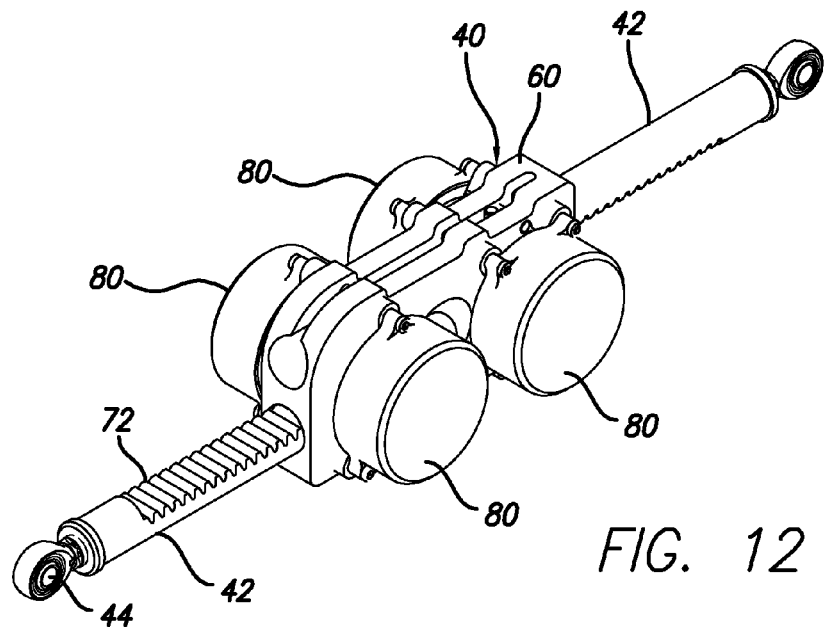
FIG. 12 perspective view of a viscous shear damping strut assembly, such as might house a highly viscous fluid such as silicone.
Figure 14:
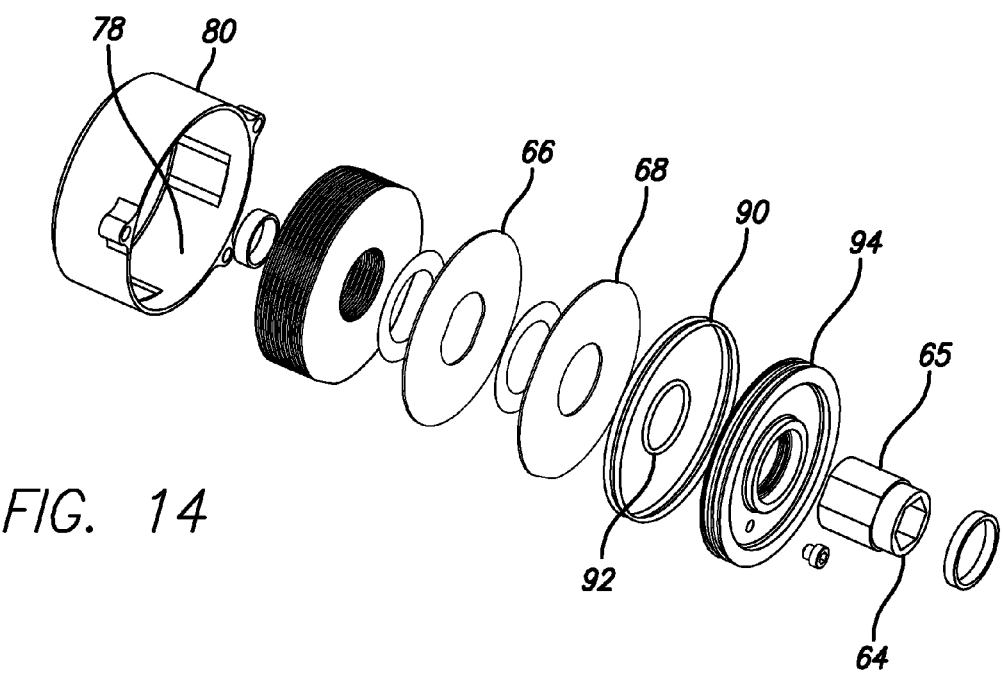
FIG. 14 shows an exploded view of a cup-shaped enclosure with disks and plates.
Figure 13:
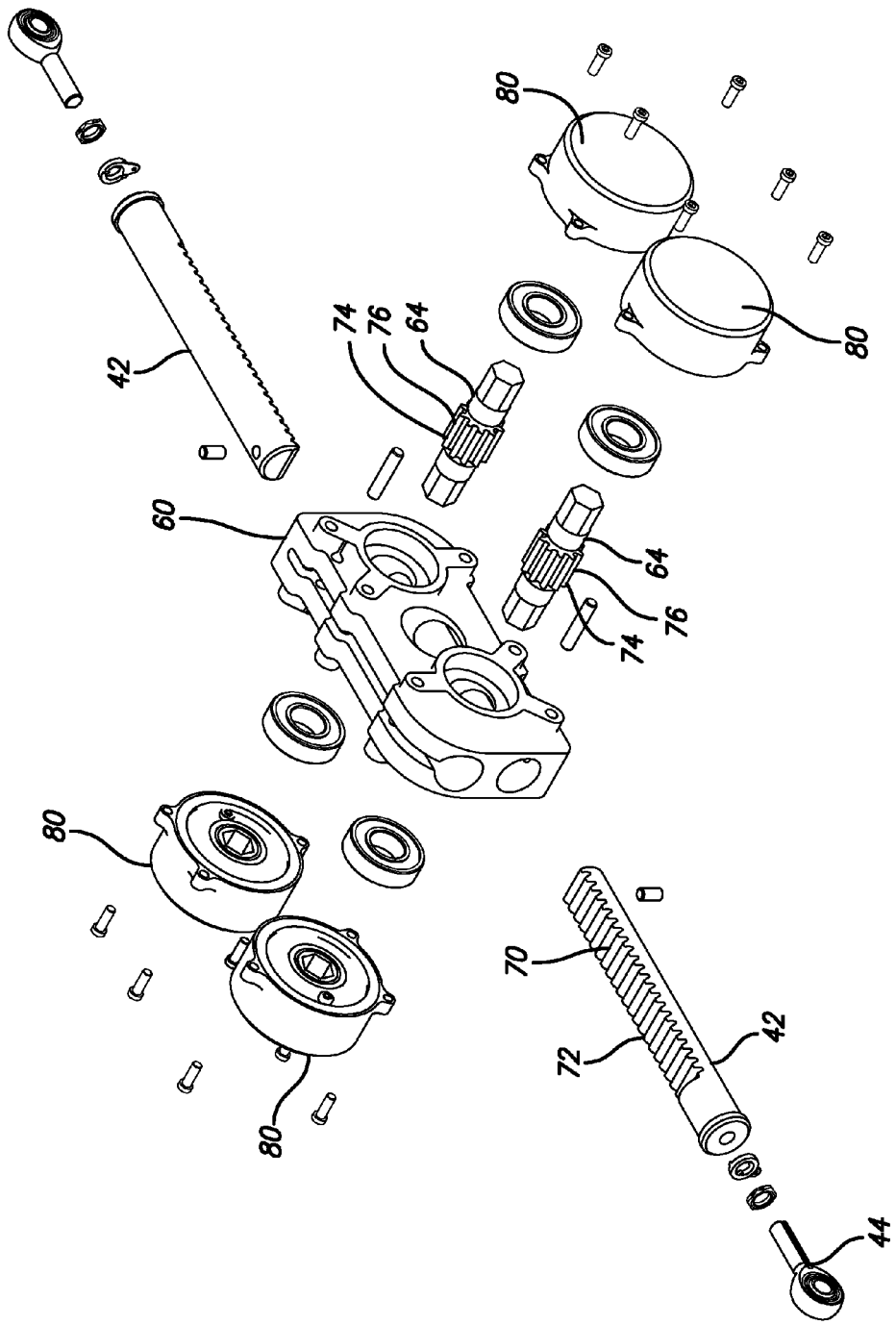
FIG. 13 is an exploded view of a viscous shear damping strut assembly.

The housing 60 has cavities 78, which are covered by side enclosures 80 to form a reservoir 50. As shown in FIGS. 7 and 11, the housing 60 can form most of the reservoir that is covered by a panel as the side enclosure 80, or as shown in FIGS. 13 and 14, the side enclosure 80 can be cup-shaped attached to a flatter housing 60. As illustrated, four cavities are provided. The pinion gears 74 are part of extended axles 64 preferably with a series of spaced disks 66 mounted thereupon, which are in fluid-filled reservoirs 50 on the side of the housing 60.

The axle 64 extends into the reservoir 50. The reservoir 50 preferably has spaced static plates 68 that are interdigitated with the disks 66 on the axle 64. The axles 64 preferably drive alternate disks 66 inside the sealed reservoirs 50, which are adjacent to static or fixed plates 68. As such, numerous fixed plates 68 adjacent to driven disks 66 produce a large fluid shear area for damping. A static plate 68 may have a flat side (not shown) that prohibits them from rotating when used in conjunction with a flat surface 82 on the housing 60 that forms a portion of the reservoir 50 as shown in the cut-away depiction in FIG. 11 with disks removed for clarity. The axle 64 enters into a sealed reservoir 50 (with a viscous fluid 62 sealed therein) where minimal internal pressure provides for easy sealing.

As shown in FIG. 11, static seals 84 can be used between the housing 60 and each of the side enclosures 80. Rotary seals 86 can be used between the axles 64 and the housing 60. As shown in FIG. 14, static O-rings 90 can be used with rotary O-rings 92. Based on the preferred silicone fluid, the damping device 40 circumvents high pressure seals or sliding "axial" seals, which may break down or fail more quickly in the harsh environment in which modern aircraft jet engines operate. The reservoir 50 preferably includes a non-abrasive, non-volatile fluid 62 that is stable over a wide temperature range, such as inert pure silicone fluid. The reservoir 50 can contain fluid 62 of a desired viscosity to accomplish the shear between disks 66 and 68 to dampen movement. The damping force can be affected by the viscosity of the fluid 62. Highly viscous silicone fluid 62 is not prone to leaking.

The static plates 68 adjacent to disks 66 driven by the axle 64 establish a large fluid shear area for damping when the reservoir 50 is filled with a high viscosity fluid 62. As a damping unit, the damping device 40 uses the principles of viscous shear between disks 66 and 68 in a viscous fluid 64, including but not limited to silicone, for a linear strut assembly 42.

FIG. 14 shows an exploded view of a cup-shaped enclosure 80 that forms part of the cavity 78 capable of enclosing a disk 66 driven by the axle 64 and an adjacent plate 68 that is static relative to the driven disk 66. Static O-rings 90 can be used with rotary O-rings 92 adjacent a cap 94 through which the axle 64 passes. An inner drive 65 may be part of the axle 64 or may complementarily attach to the axle 64 as a separate piece.

Preferably, the damping device 40 allows for bi-directional damping where the strut 42 extends and retracts at different rates. The damping device 40 can retract and extend at different rates with a roller clutch bearing 96 that rotates freely when the strut 42 retracts and engages when the strut 42 extends.

Optionally, the damping device may include an integrated lock-open feature. Typically, rod ends 38 are at each end of the strut 42, but various attachment means can be used based on the configuration and fasteners or connectors with the items, 16, 18 and 22, with which the damping device 40 is used.

The damping device 40 can be used for smooth, consistent, and controlled operation in opening a panel or cowling 16 or 18 typically used in conjunction with one or more hold-open rods 26 or 28 at the distal end of the cowling of an aircraft engine 12. The damping device 40 is not adversely affected by small air pockets in the reservoir 50. The damping method offers smooth and consistent damping load.

Damping movement of at least one strut 42 includes moving the panel 16 or 18 that causes a strut 42 to move relative to the housing 60 with the fluid-filled reservoir 50 having static plates 68. The moving strut 42 includes moving a toothed rack 70 on at least a portion of the strut 42, which, in turn, rotates a pinion gear 74 on an axle 64 that is cooperatively positioned for engaging the toothed rack 70 of the strut 42. Spaced disks 66 on the axle 64 rotate adjacent to relatively static plates 68 inside the reservoir 50 causing viscous shear to dampen movement of the strut 42.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

I claim:

1. A device for damping movement of a strut, the damping device comprising:
    at least one housing with an associated reservoir;
    at least a pair of parallely extending, axially offset struts operatively associated with the housing, each of the struts being linearly moveable to extend and retract relative to the housing;
    a toothed rack on at least a portion of each of the struts;
    a pinion gear on an axle extending from opposite sides of the housing and cooperatively positioned for engaging the toothed rack of each of the struts, wherein teeth of the rack mate with teeth of the corresponding pinion gear;
    spaced disks on the axle inside the reservoir of the housing, and
    a viscous fluid retained in the reservoir, with spaced static plates adjacent to the spaced disks on the axle to dampen movement of the struts.

2. The device of claim 1 having at least two reservoirs, wherein each axle drives a series of spaced disks inside separate sealed reservoirs, each with spaced static plates interdigitated with the spaced disks on the axles.

3. The device of claim 1 wherein the housing has a flat portion forming a flat surface as part of the reservoir wherein the static plates are not fixed to the reservoir but have a flat side that prohibits them from rotating when used in conjunction with the flat surface of the reservoir.

4. The device of claim 1 wherein the viscous fluid is silicone.

5. The device of claim 1 further including a roller clutch bearing that rotates freely when the strut retracts and engages when the strut extends, wherein the axle operates with the roller clutch bearing allowing for bi-directional damping where the strut can extend and retract at different rates.

6. The device of claim 1 wherein the spaced static plates are interdigitated with the spaced disks on the axle.

7. The device of claim 1 wherein the housing forms a cavity that is covered by a side enclosure to form the reservoir.

8. The device of claim 7 further comprising a static seal between the housing and the side enclosure.

9. The device of claim 1 further comprising a rotary seal between the axle and the housing.

10. In an aircraft engine nacelle having an aircraft structure with an aircraft panel pivotally attached, a system for smooth, consistent and controlled opening of the aircraft panel comprising:
    a hold open rod attached at one end to the aircraft structure and a distal end of the rod being attachable to the aircraft panel,
    a latch for controllably securing the aircraft panel in a closed position, and
    a damping device using viscous shear, the damping device attachable at opposite ends to the aircraft structure and the aircraft panel, the damping device including:
    a housing with at least one associated reservoir;
    a pair of parallely extending, axially offset struts operatively associated with the housing, each of the struts being linearly moveable to extend and retract relative to the housing, each of the struts being connectable to a corresponding one of the aircraft structure and the aircraft panel;
    a toothed rack on at least a portion of each of the struts;
    at least a pair of pinion gears carried on an axle and cooperatively positioned for engaging the toothed rack of the corresponding strut;
    a disk on the axle inside the reservoir; and
    a viscous fluid sealed in the reservoir, with a static plate adjacent to the disk on the axle to dampen movement of the strut.

11. The device of claim 10 further including a roller clutch bearing that rotates freely when the strut retracts and engages when the strut extends, wherein the axle operates with the roller clutch bearing allowing for bi-directional damping where the strut can extend and retract at different rates.

12. The device of claim 10 wherein the housing forms a cavity that is covered by a side enclosure to form the reservoir.

13. The device of claim 12 further comprising a static seal between the housing and the side enclosure.

14. The device of claim 10 further comprising a rotary seal between the axle and the housing.

15. In an aircraft engine nacelle having an aircraft structure with an aircraft panel pivotally attached, a system for smooth, consistent and controlled opening of the aircraft panel comprising:
    a hold open rod assembly attached at one end to the aircraft structure and a distal end of the rod assembly being attached to the aircraft panel,
    a latch for controllably securing the aircraft panel in a closed position, and
    a damping device using viscous shear, the damping device attachable at opposite ends to the aircraft structure and the aircraft panel, the damping device including:

a housing with at least one associated reservoir;

a plurality of parallely extending, axially offset struts operatively associated with the housing, each of the struts being linearly moveable struts that can extend and retract relative to the housing, each strut having a portion formed as a toothed rack at one end and being connected to a corresponding one of the aircraft structure and the aircraft panel at and end distal from the housing;

a plurality of axles each having a pinion gear on a portion associated with each toothed rack of one of the struts, wherein teeth of the rack mate with teeth of the pinion gear, wherein each axle drives a series of spaced disks inside separate sealed reservoirs, and a viscous fluid retained in each reservoir, with spaced plates interdigitated with the spaced disks on the axle to dampen linear movement of the struts.

16. The device of claim 15 further including roller clutch bearings that rotate freely when each strut retracts and engages when the strut extends, wherein the axle that operates with each roller clutch bearing allows for bi-directional damping so each strut can extend and retract at different rates.

17. The device of claim 15 wherein the housing forms cavities that are covered by side enclosures to form the reservoirs.

18. The device of claim 17 further comprising static seals between the housing and the side enclosures.

19. The device of claim 15 further comprising a rotary seal between each axle and the housing.

* * * * *